Figure 1:
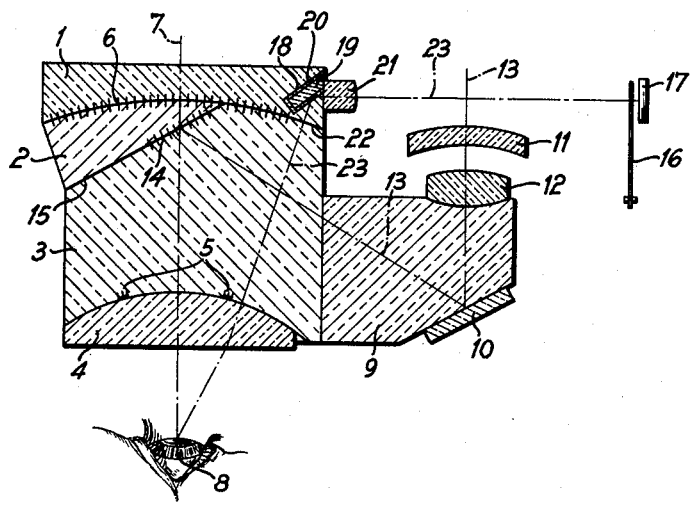

July 6, 1965  F. PAPKE  3,192,826
BLOCK TYPE ALBADA VIEWFINDER WITH INDICATOR VIEWING
MIRROR AND LENS CARRIED BY FRONT ELEMENT
Filed Oct. 17, 1961

INVENTOR
FRIEDRICH PAPKE
By Blum, Moscovitz,
Friedman and Blum
Attorneys

3,192,826
BLOCK TYPE ALBADA VIEWFINDER WITH INDICATOR VIEWING MIRROR AND LENS CARRIED BY FRONT ELEMENT
Friedrich Papke, Braunschweig, Germany, assignor to Voigtlander A.G., Braunschweig, Germany, a corporation of Germany
Filed Oct. 17, 1961, Ser. No. 145,599
Claims priority, application Germany, Nov. 2, 1960,
V 12,195
2 Claims. (Cl. 88—1.5)

This invention relates to Albada type distance measuring and ranging viewfinders and, more particularly, to finders of this type constructed and arranged to provide, in the field of view of one looking through the viewfinder, an image of the position of an indicator, scale, or the like located extraneous to the viewfinder.

There is a known design of block type Albada viewfinder in which an image of a range indicator, re-set indicator, scale, or the like is provided in the viewfinder field of view by means of an oblique mirror cemented into a slot in the intermediate transparent block of the viewfinder, and wherein such image is focused at substantially infinity by means of a collimator lens cemented to such intermediate block in such a manner as to direct the image forming light rays to the oblique mirror. This design is successfully used where the indicator or the like whose image is to be provided in the viewfinder is so positioned that the image appears in the upper or lower part of the viewfinder.

On the other hand, problems arise when it is desired to use this arrangement where the image of the extraneous element or elements must be directed into the viewfinder so as to appear laterally of the frame limiting or defining the objective field, or possibly just inside the lateral edge of this frame. These problems arise due to the fact that, in modern miniature cameras, there is less free space available in the camera hood which accommodates the viewfinder or a range finder, owing to the fact that the available space is substantially completely utilized to accommodate the exposure meter, mechanical elements, such as gears, the re-wind mechanism, and other components of the camera.

The present invention is directed to a block type Albada distance measuring and ranging viewfinder in which the foregoing difficulties and problems are overcome. In the invention viewfinder, the available space, though small, is efficiently utilized by mounting the oblique mirror, which reflects the light rays imaging the extraneous indicator or scale to the eye of the user, in the front lens or front optical element of the finder, as distinguished from the known practice in which such oblique mirror is mounted in the intermediate transparent block of the Albada viewfinder.

Since it is well known that the front lens or optical element of block type Albada type finders is relatively thin, the provision therein of a slot to receive the oblique mirror is likely to cause substantial optical weakening of the mirror. To prevent any such undersirable enfeeblement, in the invention arrangement, the slot for receiving the mirror extends across only part of the full width of the front lens and is provided by milling a blind hole or a blind slot in the lens to form a pocket into which the oblique mirror may be cemented. Blind holes or slots of this type can be produced in the front lens by standard methods practiced in the processing of glass, although other methods, such as boring with the aid of ultrasonic boring tools, can be used equally successfully to form the pocket.

Figure 2:
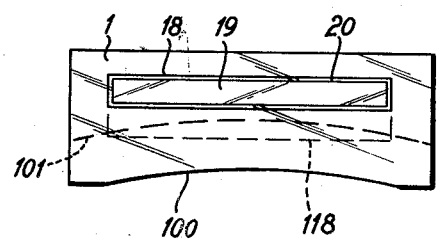

For an understanding of the principles of the invention, reference is made to the following description of a typical embodiment thereof as illustrated in the accompanying drawings. In the drawings:

FIG. 1 is an essentially axial sectional view through a combined block type Albada viewfinder and range finder embodying the invention; and FIG. 2 is a side elevational view of the front lens of the viewfinder of FIG. 1, particularly illustrating the slot in which the oblique mirror is cemented.

Referring to FIG. 1 of the drawing, the block type Albada viewfinder therein illustrated comprises the usual front lens 1, which may have a plane outer surface and a concave, and preferably spherically concave, inner surface. Front lens 1 is cemented to an intermediate block member comprising elements 2 and 3, of transparent material such as glass, joined together along a cemented interface 15 which is oblique to the optical axis 7 of the viewfinder. The objective or outer ends of the parts 2 and 3 form, with the concave inner face of the front lens 1, an interface which is concave toward the eye and in which is positioned the usual semi-light permeable mirror 6. The viewfinder further includes the usual rear or frame supporting member 4 having the objective defining frame 5 disposed at the interface between its object facing and preferably convex surface and the eye facing and preferably concave surface of the intermediate member 2, 3. In a known manner, an image of frame 5 is provided at substantially infinity by the mirror 6, as frame 5 is located in substantially the focal plane of mirror 6.

The viewfinder illustrated in FIG. 1 is also a measuring finder or range finder. For this purpose, a transparent component, such as a glass component, is cemented to a lateral face of part 3 so as to extend laterally therefrom to form the base of the range finder. In a known manner, component 9 has a mirror 10 mounted thereon to reflect the measuring or ranging light ray 13, entering through the lenses 11 and 12 acting as an ABAT wedge, to the partially light permeable mirror 14 acting as a ray divider. The lenses 11 and 12 are relatively adjustable to set the range finder distance indication. Mirror 14 is mounted in the cement interface 15 between parts 2 and 3, and directs the finder ray 13 into the eye 8.

In accordance with the present invention, the viewfinder of FIGS. 1 and 2 is designed to provide, in the field of view of one looking through the viewfinder toward the object, an indication of the position of an extraneous indicator 16 moving over a scale 17. For this purpose, a blind slot or pocket 18, extending generally oblique to the optical axis 7 of the viewfinder, is produced in a lateral edge of the front lens 1. A mirror 19 is seated in the slot 18 and cemented therein by means of cement 20 having an index of refraction substantially equivalent to that of the front lens 1. A collimator lens 21 is cemented to this lateral face of the front lens 1 spaced forwardly of an in non-overlapping relation with respect to the intermediate block means 2, 3, and is so designed that it focuses the light rays imaging indicator 16 and scale 17 at substantially infinity, to form an image for viewing by the eye 8. The partially light-permeable concave mirror 6 of the viewfinder is omitted over the portion 22 of the interface between the front lens 1 and the intermediate member 2–3, to provide for unobstructed passage of the light ray 23 providing the image of indicator 16 and scale 17. Light ray 23 is directed through the portion 22 of the interface by reflection from the oblique mirror 18 so positioned as to direct ray 23 to the eye 8.

The type of viewfinder shown in FIG. 1 is merely exemplary of how the invention principles may be applied, and it will be appreciated that variants of the viewfinder design may be made within the scope of the invention without affecting the application of the principles of the invention. For example, the principles of the invention are applicable to viewfinders which are not also range finders, and the transparent components of the viewfinder may be made either of transparent plastic material or of glass.

FIG. 2 provides a somewhat schematic representation of the pocket 18 receiving the mirror 19. In this figure, the pocket is indicated at 18, the mirror at 19, and the transparent cement at 20. The spherically concave inner face of the front lens 1 is represented by the lines 100 and 101, and the obliquity of the slot 18 is indicated by the broken line 118. The cement 20, of course, has the same refractive index as the material of the front lens 1.

While a specific embodiment of the invention has been shown and described in detail in order to illustrate the application of the principles of the invention, it will understood that the invention may be embodied otherwise without departing from such principles.

What is claimed is:

1. A block type Albada distance measuring and ranging viewfinder, for photographic cameras, comprising, in combination, a front object facing lens having a concave inner surface; intermediate block means, of transparent material, having a convex object facing end surface forming an interface with said concave surface; a partially light-permeable mirror disposed in said interface; a rear optical element, of transparent material, having an object facing surface forming an interface with the eye facing end surface of said block means; an image limiting frame disposed in said last-named interface in substantially the focal plane of said mirror for imaging by the latter at substantially infinity a partially light-permeable oblique mirror in said intermediate block means intersecting the optical axis of said viewfinder inwardly of said mirrored interface and facing said rear optical element; an optical system disposed laterally of said intermediate block means and effective to direct light rays from the object laterally into said intermediate block means and to said oblique mirror, said oblique mirror directing the latter light rays to the eye of an observer looking through the viewfinder; a slot formed in a lateral surface of said front lens, located in its entirety in the vicinity of said lateral surface of said front lens, spaced forwardly from said intermediate block means, and said slot being a blind bore with parallel side walls formed in the front portion of the lateral surface of the front lens and extending inwardly and obliquely to terminate forwardly on the concave inner surface and extending generally oblique to the optical axis of the viewfinder; a reflecting mirror positioned in said slot in the path of light rays from an indicator or the like located laterally extraneous of the viewfinder; and a plano-convex collimator lens mounted on said lateral surface of said front lens in advance of said reflecting mirror with its plano surface cemented to the lateral surface of said front lens in alignment with the reflecting mirror in said slot, said path of light rays extending through said collimator lens to said reflecting mirror and said collimator lens being designed and constructed to provide an image of the indicator, or the like, at substantially infinity in the field of view of an observer looking through the viewfinder, said collimator lens being situated in its entirely forwardly of and in non-overlapping relationship with respect to said intermediate block means, and said reflecting mirror being oriented and arranged to reflect said light rays to the eye of an observer looking through said rear optical element, to provide an image of the indicator or the like at substantially infinity in the field of view of such observer; whereby, due to the positioning of said reflecting mirror in said slot and said partially light-permeable oblique mirror in said intermediate block means, interference between the light rays directed by the said optical system laterally into said intermediate block means and those providing said image of the indicator or the like is prevented.

2. A block type Albada distance measuring and ranging viewfinder, as claimed in claim 1, in which said partially light-permeable mirror is omitted from that portion of said first-named interface through which pass the light rays reflected from said last-named mirror.

References Cited by the Examiner

UNITED STATES PATENTS

| | | |
|---|---|---|
| 2,994,257 | 8/61 | Papke. |
| 2,996,964 | 8/61 | Fischer et al. |
| 2,999,416 | 9/61 | Mische _____ 88—2.4 |

DAVID H. RUBIN, *Primary Examiner.*